(12) United States Patent
Sadeh

(10) Patent No.: US 9,948,672 B2
(45) Date of Patent: Apr. 17, 2018

(54) SIMULATING UNAUTHORIZED USE OF A CELLULAR COMMUNICATION NETWORK

(71) Applicant: VASONA NETWORKS INC., San Jose, CA (US)

(72) Inventor: Oren Sadeh, Tel Aviv (IL)

(73) Assignee: VASONA NETWORKS INC., San Jose, CA (US)

( * ) Notice: Subject to any disclaimer, the term of this patent is extended or adjusted under 35 U.S.C. 154(b) by 78 days.

(21) Appl. No.: 15/150,451

(22) Filed: May 10, 2016

(65) Prior Publication Data

US 2017/0324769 A1 Nov. 9, 2017

Related U.S. Application Data

(63) Continuation of application No. PCT/US2016/030672, filed on May 4, 2016.

(51) Int. Cl.

| | |
|---|---|
| *H04M 1/66* | (2006.01) |
| *H04L 29/06* | (2006.01) |
| *H04W 74/08* | (2009.01) |
| *H04W 12/12* | (2009.01) |
| *H04W 24/06* | (2009.01) |
| *H04W 88/12* | (2009.01) |
| *H04W 88/14* | (2009.01) |

(52) U.S. Cl.
CPC ......... *H04L 63/1458* (2013.01); *H04W 12/12* (2013.01); *H04W 24/06* (2013.01); *H04W 74/0833* (2013.01); *H04W 88/12* (2013.01); *H04W 88/14* (2013.01)

(58) Field of Classification Search
None
See application file for complete search history.

(56) References Cited

U.S. PATENT DOCUMENTS

| | | | |
|---|---|---|---|
| 2007/0213966 A1* | 9/2007 | Noble | H04L 41/145 703/13 |
| 2007/0250930 A1 | 10/2007 | Aziz et al. | |
| 2009/0319247 A1* | 12/2009 | Ratcliffe | G09B 19/0053 703/13 |
| 2010/0031036 A1* | 2/2010 | Chauncey | H04L 63/0428 713/168 |
| 2013/0044669 A1 | 2/2013 | Song et al. | |
| 2014/0059688 A1 | 2/2014 | Margalit | |
| 2014/0337520 A1 | 11/2014 | Raleigh et al. | |

OTHER PUBLICATIONS

Kang et al., "A practical attack on mobile data network using IP spoofing", Applied Mathematics and Information Sciences, vol. 7, issue 6, pp. 2345-2353, Nov. 1, 2013.

(Continued)

*Primary Examiner* — Erika Washington
(74) *Attorney, Agent, or Firm* — D. Kligler IP Services Ltd.

(57) ABSTRACT

Described embodiments include a system that includes a digital memory and a processor. The processor is configured to simulate, using information stored in the digital memory, an unauthorized use of a cellular communication network by at least one cellular communication terminal, by generating, and then transmitting from a network side of the cellular communication network, traffic that appears to have originated from the at least one cellular communication terminal. Other embodiments are also described.

26 Claims, 3 Drawing Sheets

(56) References Cited

OTHER PUBLICATIONS

Li et al., "Insecurity of voice solution VoLTE in LTE mobile networks", Proceedings of the 22nd ACM Conference on Computer and Communications Security, pp. 316-327, Oct. 12-16, 2015.
Kim et al., "Breaking and fixing 5 VoLTE: Exploiting hidden data channels and mis-implementations", Proceedings of the 22nd ACM Conference on Computer and Communications Security, pp. 328-339, Oct. 12-16, 2015.
International Application # PCT/US16/30672 Search Report dated Aug. 11, 2016.

* cited by examiner

SIMULATING UNAUTHORIZED USE OF A CELLULAR COMMUNICATION NETWORK

CROSS-REFERENCE TO RELATED APPLICATIONS

The present application is a continuation of, and claims the benefit of, International Application No. PCT/US16/30672, entitled "Simulating unauthorized use of a cellular communication network," filed May 4, 2016, whose disclosure is incorporated herein by reference.

FIELD OF THE INVENTION

Embodiments of the present invention relate generally to the field of cellular communication, and in particular, to protecting cellular communication networks from unauthorized use.

BACKGROUND

Kang, Dong W., et al., "A practical attack on mobile data network using IP spoofing," Applied Mathematics & Information Sciences 7.6 (2013): 2345, which is incorporated herein by reference, analyzes security threats that occurred to mobile networks recently, and checks the security threats likely to occur in actual commercial service networks and their results. The paper further proposes a countermeasure that can respond to such security threats, and presents results that can be applied to actual commercial networks.

Li, Chi-Yu, et al., "Insecurity of voice solution volte in LTE mobile networks," Proceedings of the 22nd ACM SIGSAC Conference on Computer and Communications Security, ACM, 2015, which is incorporated herein by reference, conducts a study on Voice over Long Term Evolution (VoLTE) security. The paper claims to discover several vulnerabilities in both the control-plane and data-plane functions, which can be exploited to disrupt both data and voice in operational networks. In particular, the paper claims to find that the adversary can easily gain free data access, shut down continuing data access, or subdue an ongoing call. The paper claims to validate these proof-of-concept attacks using commodity smartphones (rooted and unrooted) in two Tier-1 US mobile carriers.

Kim, Hongil, et al. "Breaking and fixing volte: Exploiting hidden data channels and mis-implementations," proceedings of the 22nd ACM SIGSAC Conference on Computer and Communications Security, ACM, 2015, which is incorporated herein by reference, presents a systematic security analysis. The paper claims to identify a number of vulnerabilities of early volte implementations, such as caller spoofing, over-billing, and denial-of-service attacks.

SUMMARY OF THE INVENTION

There is provided, in accordance with some embodiments of the present invention, a system that includes a digital memory and a processor. The processor is configured to simulate, using information stored in the digital memory, an unauthorized use of a cellular communication network by at least one cellular communication terminal, by generating, and then transmitting from a network side of the cellular communication network, traffic that appears to have originated from the at least one cellular communication terminal.

In some embodiments, the processor is configured to transmit the traffic to a core network (CN) of the cellular communication network.

In some embodiments, the processor is further configured to:
ascertain a result of the simulated unauthorized use, and generate an output indicative of the result.

In some embodiments, the processor is further configured to:
simulate an authorized use of the cellular communication network by at least one other cellular communication terminal, by generating, and then transmitting, traffic that appears to have originated from the at least one other cellular communication terminal, and
ascertain a result of the simulated authorized use,
wherein the output is indicative of both the result of the simulated unauthorized use and the result of the simulated authorized use.

In some embodiments, the at least one cellular communication terminal includes a plurality of cellular communication terminals, and the processor is configured to transmit the traffic by injecting the traffic, into a flow of traffic of the cellular communication network, from a single point in the cellular communication network.

In some embodiments, the processor is configured, in generating the traffic, to format the traffic to appear as if the traffic was received from a plurality of base stations belonging to the cellular communication network.

In some embodiments, the processor is configured to transmit the traffic from between a radio access network (RAN) and a core network (CN) of the cellular communication network.

In some embodiments, the traffic includes a control packet, and the processor is configured to simulate the unauthorized use by unauthorizedly passing data within the control packet.

In some embodiments, the control packet includes a Session Initiation Protocol (SIP) message.

In some embodiments, the processor is configured to simulate the unauthorized use by generating, and then transmitting, traffic that includes a destination identifier of another cellular communication terminal.

In some embodiments, the processor is configured to simulate the unauthorized use by transmitting the traffic under an identifier of another cellular communication terminal.

In some embodiments, the processor is configured to simulate the unauthorized use by simulating a denial-of-service (DoS) attack.

In some embodiments, the processor is configured to simulate the unauthorized use by simulating a control-traffic attack against the cellular communication network.

There is further provided, in accordance with some embodiments of the present invention, a method that includes generating traffic that appears to have originated from at least one cellular communication terminal, and simulating an unauthorized use of a cellular communication network by the at least one cellular communication terminal, by transmitting, from a network side of the cellular communication network, the traffic.

The present invention will be more fully understood from the following detailed description of embodiments thereof, taken together with the drawings, in which:

DETAILED DESCRIPTION OF EMBODIMENTS

Overview

Figure 1:
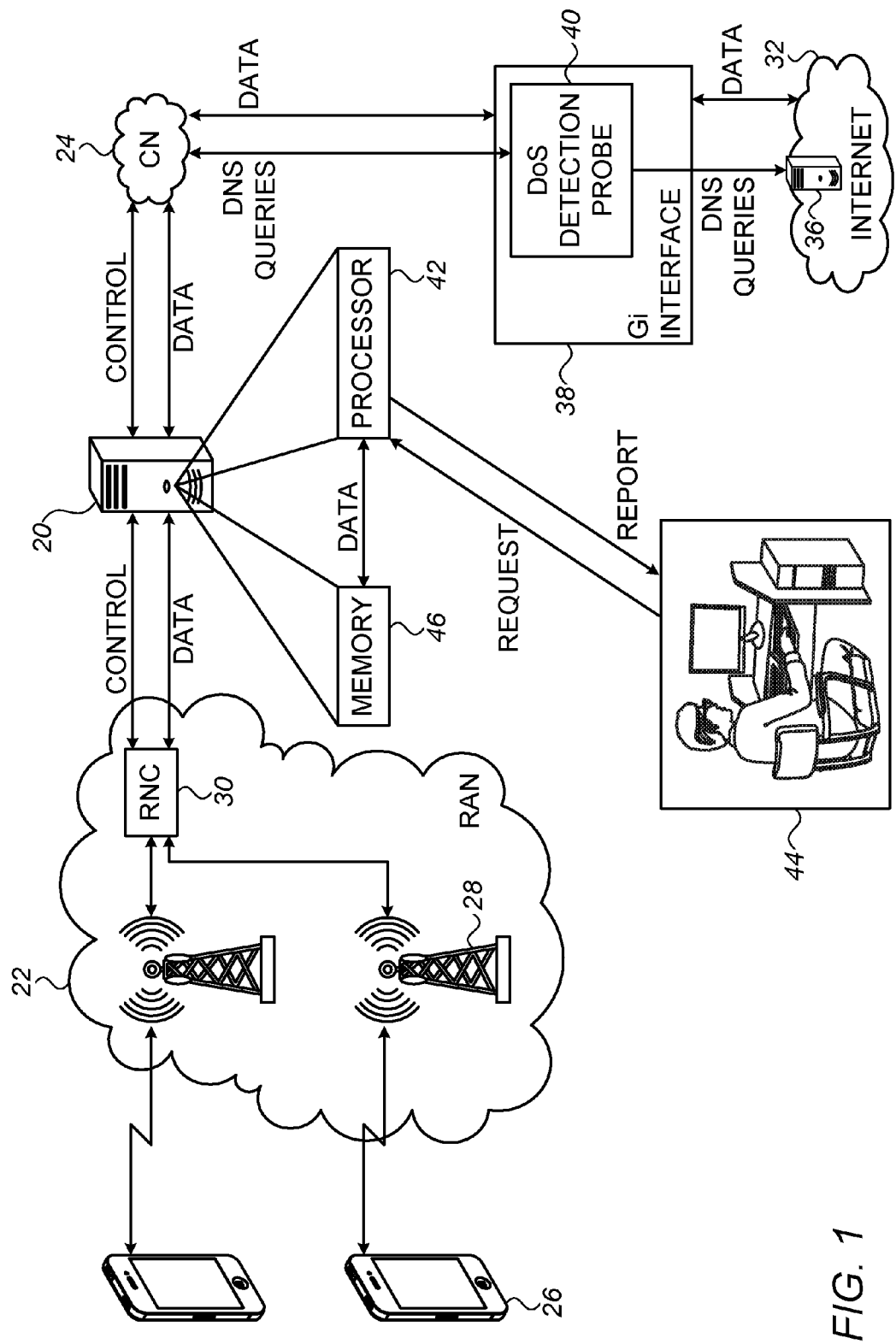
FIG. 1 is a schematic illustration of a simulation system implemented on a cellular communication network, in accordance with some embodiments of the present invention.

A cellular communication network may be vulnerable to various types of unauthorized use, including, for example, attacks against the network. Maintaining the security of cellular communication networks is thus a major challenge for the operators of such networks.

Examples of unauthorized use including the following:

(a) Internet Protocol (IP) Spoofing:

In an IP Spoofing (or "IP Address Spoofing") attack, the attacker transmits IP packets that contain a source IP address that is not the IP address of the attacker. For example, the attacker may target another cellular communication terminal, by using the IP address of the other terminal as the source address in a download request. If successful, such an attack may cause a large amount of data to be downloaded to the other (victimized) terminal, thus tying up resources on the other terminal, depleting the power source of the other terminal, and/or generating a large amount of billing to the other terminal.

(b) Denial-of-Service (DoS) Attacks:

A DoS attack is an attempt to render a network resource unavailable to its intended users. One type of DoS attack, in which a large number of attacking devices participate, is known as a distributed denial-of-service (DDoS) attack. In a DDoS attack, a large number of devices may flood the network resource with spurious requests, such that the network resource becomes unable to respond to legitimate requests from users. Such an attack may be conducted, for example, against a Domain Name System (DNS) server, by flooding the DNS server with spurious DNS queries. Alternatively, such an attack may be directed against one or more servers serving the core network (CN) of the cellular communication network. For example, the attackers may transmit a large number of spurious control signals to the CN, thus rendering the servers on the CN less responsive to legitimate requests from users.

(c) Illicit Exchange of Data:

In some cases, particularly on Long Term Evolution (LTE) networks, a cellular communication terminal may exchange data on the control plane, by, for example, passing data within a Session Initiation Protocol (SIP) message. This may result in a bypassing of the network's billing resources, and/or in a denial of service to legitimate users, given the higher priority accorded, by the network, to the control plane. (Such illicit exchanges of data are described, for example, in the above-cited article to Kim et al., which is incorporated herein by reference.)

(d) Subscriber-to-Subscriber Traffic:

Normally, communication between subscribers of the network passes through the CN of the network. However, a subscriber may attempt to unauthorizedly exchange communication directly with another subscriber, by including within the transmitted packets a destination identifier, such as a destination IP address, of the other subscriber. If the network is not properly configured to prevent such communication, the CN—which includes, inter alia, the network's billing resources—may be bypassed.

Embodiments of the present invention provide an operator of a cellular communication network with tools that allow the operator to more effectively secure the network against unauthorized use. In particular, embodiments of the present invention provide a simulation system (or "simulator") that is under the control of the operator of the cellular communication network. The system is configured to simulate any relevant unauthorized use of the network (such as any of the unauthorized uses described above) by at least one cellular communication terminal, by generating, and then transmitting from the network side of the cellular communication network, traffic that is formatted and/or encrypted to appear as if the traffic originated from the cellular communication terminal. In simulating the unauthorized use, the system may transmit the traffic to the CN of the network, directly, or via other nodes in the network.

In the context of the present application, including the claims, the phrase "on the network side" includes within its scope any suitable location on the base stations belonging to the cellular communication network, between the base stations and the CN of the network, or on the CN itself. The phrase "network side" thus excludes the "terminal side" of the network, where the cellular communication terminals that use the network reside.

Further to simulating the unauthorized use, the system ascertains the response of the network to the unauthorized use, and reports the response to the operator of the network. In this manner, the operator of the network can assess, and improve where necessary, the security of the network.

Advantages of embodiments described herein include at least the following:

(i) Since the system transmits the simulated traffic from the network side of the cellular communication network, the system may inject into the flow of network traffic, even from a single point in the network, traffic that appears to originate from any number of different cellular communication terminals, and/or appears to have been received from any number of different base stations, by formatting and/or encrypting the traffic in accordance with the relevant simulation use case. Thus, for example, the system may simulate a DDoS attack by generating, and communicating to the CN, a large amount of traffic that appears to the CN to have originated from a large number (e.g., 10,000) of different subscribers, spread over a wide geographical area that is covered by a plurality of base stations. On the other hand, if the system were to transmit the simulated traffic from the terminal side of the cellular communication network, the simulation of a DDoS attack might be impossible, without employing a large number of simulating systems, and/or actual cellular communication terminals, spread over a wide geographical area.

(ii) Due to the system formatting and/or encrypting each item of traffic to appear as if it was received from a particular cellular communication terminal and base station, the system is transparent to the CN, in that the CN cannot differentiate between traffic originating from the system and traffic originating from actual cellular communication terminals. Hence, the simulations performed by the system yield an accurate assessment of the ability of the CN to cope with actual cases of unauthorized use.

(iii) The operator may request, from the system, the performance of any relevant simulation, whenever the operator deems such a simulation prudent, e.g., following an update to the infrastructure of the network. Upon receiving a request from the operator, the system immediately, and automatically, performs the requested test. There is no need, for example, to first specially-configure one or more cellular communication terminals, or to send individuals "into the field" to conduct tests.

System Description

Reference is initially made to FIG. 1, which is a schematic illustration of a simulation system 20 implemented on a cellular communication network, in accordance with some embodiments of the present invention. In the particular example shown in the figure, system 20 is implemented on a Universal Mobile Telecommunications System (UMTS) cellular communication network. It is noted, however, that system 20 may be similarly implemented on any other type of cellular communication network, such as, for example, an LTE network.

The cellular communication network depicted in FIG. 1 includes a RAN 22 and a CN 24. RAN 22 includes one or more base stations 28, served by at least one radio network controller (RNC) 30, which manages the flow of communication between base stations 28 and CN 24. (Typically, a cellular communication network comprises a plurality of RNCs. For simplicity, however, FIG. 1 and the present description assume a single RNC.) Thus, in general, cellular communication terminals 26 exchange communication with CN 24 via RNC 30, via base stations 28. In general, communication across the network occurs on two planes: the control plane and the data plane. The data plane carries data that are consumed or provided by subscribers (e.g., voice communication, and data downloaded from or uploaded to the Internet), while the control plane carries data that support the data plane, e.g., data relating to billing and routing.

Amongst other functions, CN 24 provides terminals 26 with access to the Internet 32, such that data may be communicated from the terminals to the Internet, and vice versa. CN 24 is connected to the Internet via a Gi Interface 38, at which reside one or more dos detection probes 40. DNS queries from terminals 26 are forwarded by the CN to the relevant DNS server 36, via a DoS detection probe 40, which monitors the received queries for suspicious patterns of activity that may indicate an ongoing DoS attack. For example, the probe may monitor the queries for evidence of one or more subscribers submitting an abnormally large number of requests during a short period of time. (Probe 40 belongs to the cellular communication network.)

System 20 may be implemented on a single server, or on a cooperatively networked or clustered set of servers. System 20 comprises a processor 42, which is configured to perform the simulations described herein, in response to requests received from the operator 44 of the network. For each simulation, processor 42 processes the response of the network, and reports the response to operator 44. System 20 further comprises a digital memory 46 (comprising, for example, non-volatile secondary storage, such as a hard drive), which stores data related to the simulations. Before, during, and/or following the performance of a simulation, data may be exchanged between processor 42 and memory 46.

In general, processor 42 may be embodied as a single processor, or as a cooperatively networked or clustered set of processors. Processor 42 is typically a programmed digital computing device comprising a central processing unit (CPU), random access memory (RAM), network interfaces, and/or peripheral devices. Program code, including software programs, and/or data, are loaded into the RAM for execution and processing by the CPU and results are generated for display, output, transmittal, or storage, as is known in the art. The program code and/or data may be downloaded to the processor in electronic form, over a network, for example, or they may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Typically, system 20 is at least partly located on the network side of the cellular communication network, such that any generated traffic may be injected into the network-side flow of traffic, and the network-side return traffic may be probed. (For example, at least the network interface(s) for traffic injector 56 and probe 60, which are described below with reference to FIG. 2, may be located on the network side of the cellular communication network.) As noted above, in the context of the present application, including the claims, the phrase "on the network side" includes within its scope any suitable location on the base stations, between the base stations and the CN of the cellular communication network (e.g., between the base stations and RNC 30, on the RNC, or between RAN 22 and CN 24, as shown in the figure), or on the CN itself.

Figure 2:
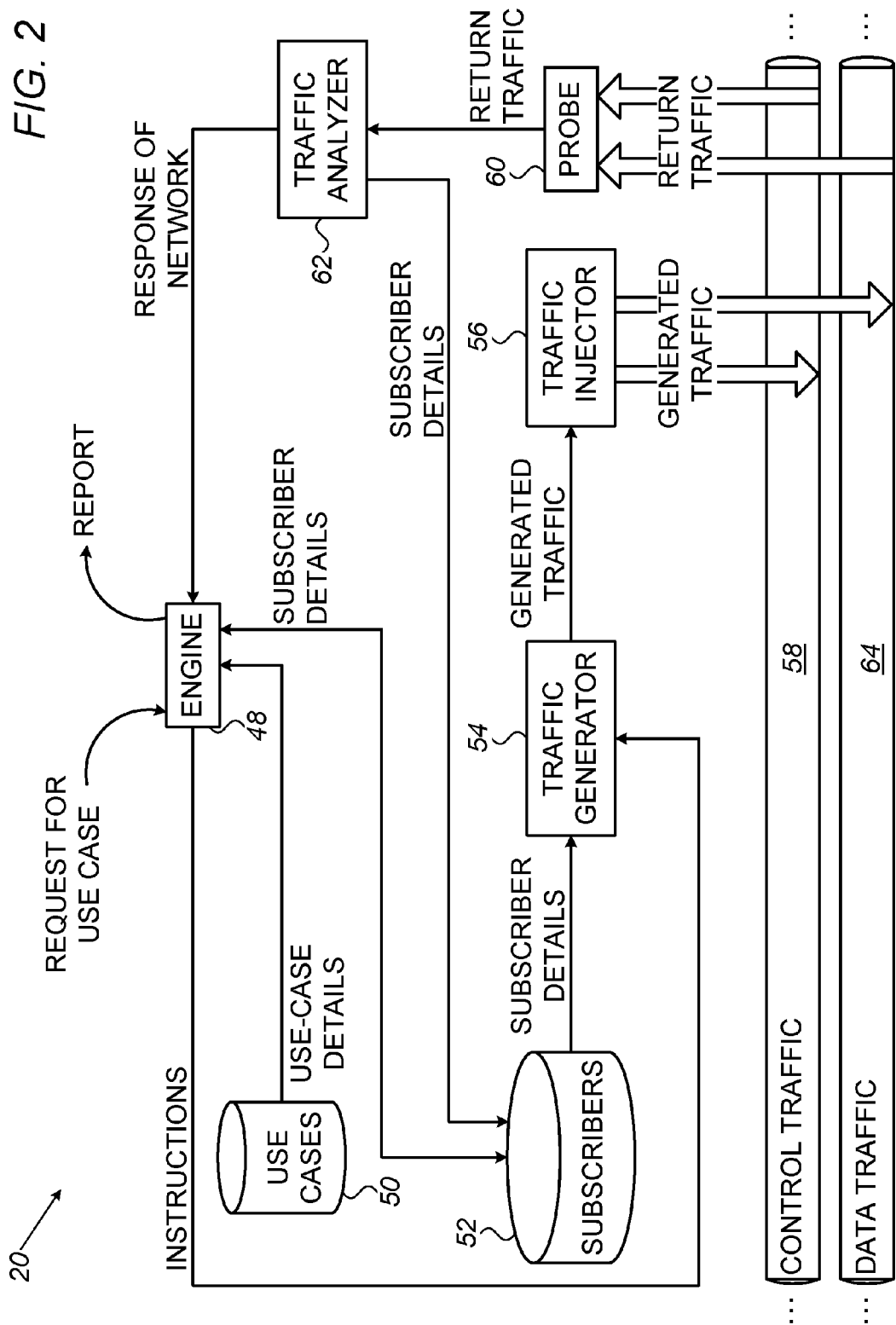
FIG. 2 is a functional diagram of a simulation system, in accordance with some embodiments of the present invention.

Reference is now made to FIG. 2, which is a functional diagram of system 20, in accordance with some embodiments of the present invention. In general, each of the functional components shown in FIG. 2 is implemented on processor 42 and/or on memory 46. For ease of description, however, the description below relates to each functional component as an independent entity, without necessarily explicitly tying the functional component to the processor or the memory. For example, the description below may refer to a function being performed by "the engine," without necessarily specifying that the function is performed by the processor executing a particular piece of software code that instructs the processor to perform the "engine" function.

It is also noted that the functional configuration (i.e., the "division of labor") shown in FIG. 2 is only one of many possible functional configurations that system 20 may adopt. For example, in some embodiments, several of the functional components shown in FIG. 2 may be combined into a single functional component, i.e., a single piece of code may cause multiple functions to be performed.

As shown in FIG. 2, requests for particular use cases (i.e., requests for simulations of particular unauthorized uses of the network) are received, from the operator, by an engine 48. In response to a particular request, engine 48 retrieves the relevant use-case details from a use-case database 50. Such details may specify, inter alia, the number of simulated subscribers to be used for the simulation, the tasks to be performed by the simulated subscribers, and the expected response of the network to the simulation. If necessary, the engine may then create one or more simulated subscribers in a subscriber database 52. For example, the engine may store, in subscriber database 52, one or more IMSIs, and/or other information, that identify the new simulated subscribers. Alternatively, if suitable simulated subscribers already exist in the subscriber database, the engine might not create any new simulated subscribers.

(It is noted that the "simulated subscribers" referred to herein do not necessarily have all of the properties that would normally be associated with actual, human subscribers. For example, the engine does not necessarily give each simulated subscriber a first and last name. Rather, a "simulated subscriber" may be effectively a simulated cellular communication terminal, having only those properties that are required for the simulation (e.g., an IMSI and an identifier of the base station to which the simulated terminal is to be "attached" in the simulation). Thus, it should be understood that, within the context of the present description and claims, the terms "subscriber" and "cellular communication terminal" may be used interchangeably.)

Next, if the engine does not already have the simulated subscriber details, the engine loads the simulated subscribers from the subscriber database. The engine then sends instructions—which include the simulated subscriber details—to a traffic generator 54, instructing traffic generator 54 to generate control traffic that indicates, to the network, requests to attach the simulated subscribers to the network. Traffic generator 54 passes the generated control traffic to a traffic injector 56, which injects the generated control traffic into the control traffic flow 58. A probe 60 receives the return control traffic—which includes the respective responses of the network to the requests—from the network. The return traffic is analyzed by a traffic analyzer 62. Upon ascertaining that the network has acceded to the attachment requests, the traffic analyzer updates the details for the simulated subscribers in the subscriber database, to indicate that the simulated subscribers may now begin communicating on the network.

Upon noting the update in the subscriber database, the engine begins the simulation by communicating instructions to the traffic generator to generate control traffic and/or data traffic in accordance with the use-case details. The traffic injector injects the generated traffic into control traffic flow and/or data traffic flow 64. Return traffic, received via probe 60, is analyzed by the traffic analyzer. The traffic analyzer ascertains the response of the network to the simulation, and passes the response to the engine. (The traffic analyzer may also update the subscriber details in the subscriber database, as appropriate.) The engine ascertains the result of the simulation, by comparing the response of the network to the expected response as indicated by the use-case details. Finally, the engine generates an output—such as a report to the operator of the network—that indicates the result.

In some instances, the use-case details may call for the transmission of attachment requests. For example, a particular simulation may test the response of the network to multiple spurious attachment requests. In such instances, the above-described attachment requests, and the ascertaining of the response of the network thereto, may be executed during, rather than prior to, the simulation.

As may be ascertained from both FIG. 1 and FIG. 2, system 20 is typically "active." That is, the system resides along the path of preexisting network infrastructure through which data flow, such that the system receives, and forwards on, packets passing through the network, rather than merely receiving copies of such packets. This configuration facilitates the injection of simulated traffic by the system. It is noted, however, that other embodiments, in which system 20 is "passive," i.e., system 20 receives only copies of traffic passing through the network, are also included within the scope of the present disclosure.

Figure 3:
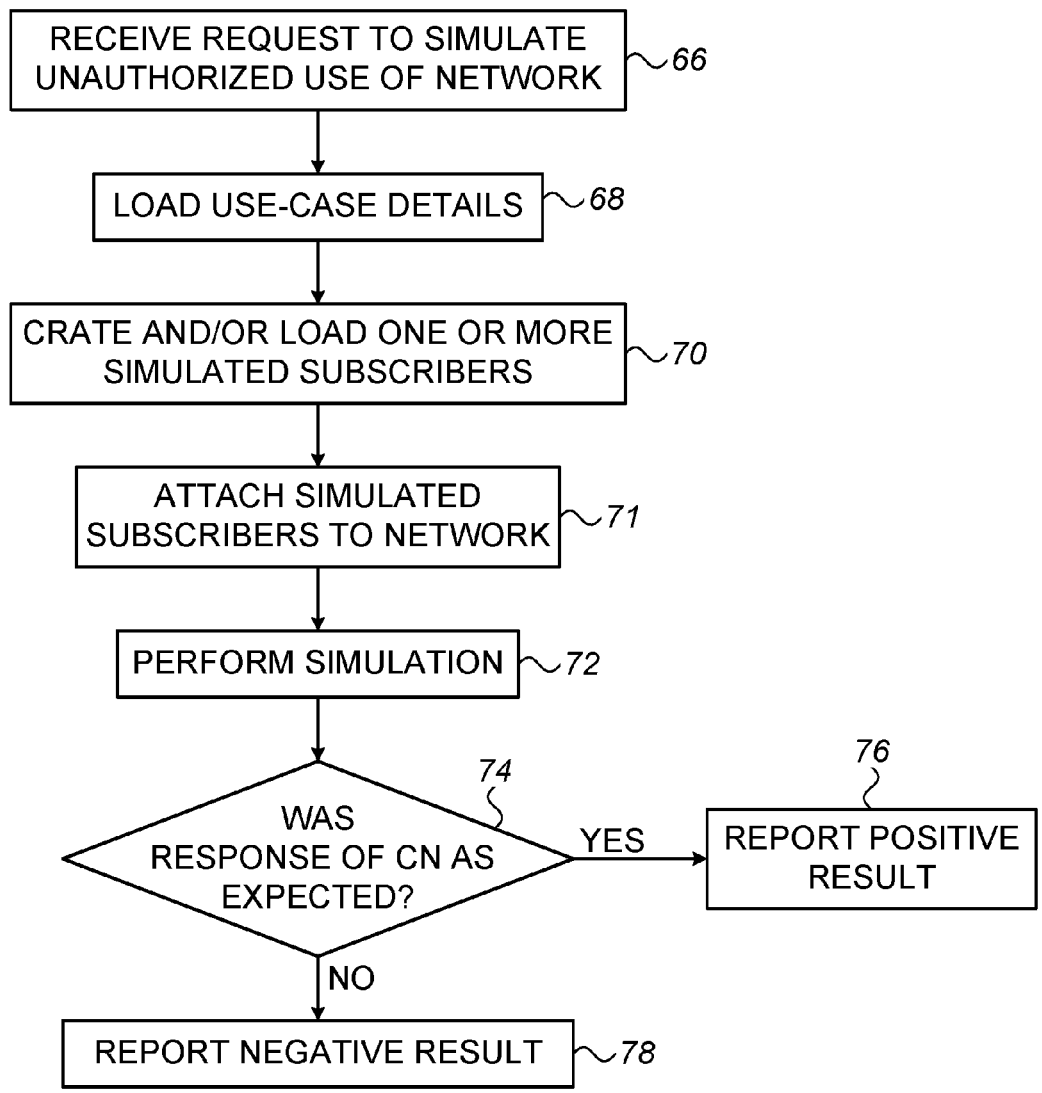
FIG. 3 is a flow diagram for a method for simulating an unauthorized use of a cellular communication network, in accordance with some embodiments of the present invention.

Reference is now made to FIG. 3, which is a flow diagram for a method for simulating an unauthorized use of a cellular communication network, in accordance with some embodiments of the present invention. Generally, the steps shown in FIG. 3 were already described with reference to FIG. 2. Nonetheless, FIG. 3 is provided for the sake of further clarity, and for use as a "template" for the specific simulation descriptions that follow.

First, at a request-receiving step 66, the engine receives a request to simulate an unauthorized use of the network. Further to receiving the request, the engine loads the relevant use-case details from use-case database 50, at a loading step 68. Subsequently, at a creating-and-or-loading step 70, the engine creates one or more simulated subscribers from subscriber database 52, and/or loads (the details for) one or more simulated subscribers from the subscriber database. Next, at an attachment step 71, the simulated subscribers are attached to the network, as described above with reference to FIG. 2.

Subsequently, at a simulation-performing step 72, using traffic generator 54 and traffic injector 56, system 20 performs the relevant simulation, by generating relevant traffic, and injecting the traffic into the control flow and/or data flow, as described above. (As described above, in some cases, attachment step 71 and simulation-performing step 72 may coincide.) Subsequently, at a response-checking step 74, using probe 60, traffic analyzer 62, and engine 48, the system checks whether the response of the CN was as expected. In other words, the system checks whether the response of the CN matches the "correct" response defined in the use-case details. If the response was as expected, the system reports a positive result, at a positive-result-reporting step 76. Otherwise, the system reports a negative result, at a negative-result-reporting-step 78.

In some cases, system 20 does not perform response-checking step 74, positive-result-reporting step 76, or negative-result-reporting-step 78. Rather, a network monitoring system that is external to system 20 monitors the network, and generates any relevant output (e.g., an alert and/or a report) that indicates the result of the simulation.

The ensuing description will, with reference to FIG. 3, describe, by way of example, various specific simulations that may be performed by system 20, in some embodiments.

IP Spoofing Attacks

To simulate an IP spoofing attack, the system creates and/or loads a first simulated subscriber (henceforth, "attacker") and a second simulated subscriber (henceforth, "target") at creating-and-or-loading step 70. Subsequently, at simulation-performing step 72, system 20 transmits a request, from the attacker, for data, with the source IP address of the target. In other words, system 20 passes a request for data that includes the source IP address of the target, through a data tunnel belonging to the attacker. Then, at response-checking step 74, the system checks whether data were downloaded to the target. If yes, the system reports a negative result, at negative-result-reporting-step 78. Otherwise, the system reports a positive result, at positive-result-reporting step 76. For example, the system may report a positive result if no response to the request was received at all.

More generally, the principles described above may be applied in performing any type of simulated spoofing attack, in which traffic is transmitted from a first simulated subscriber under an identifier of a second, different simulated subscriber. Such an identifier may be an IP address as described above, or may be any other type of identifier.

DoS Attacks Against a DNS Server

To simulate a DoS attack, the system creates and/or loads one or more simulated subscribers at creating-and-or-loading step 70. For example, for simulating a DDoS attack, the system may create and/or load a large number of simulated subscribers. (For this purpose, the operator may designate a large number of international mobile subscriber identities (IMSIs) for use by the system.) Subsequently, at simulation-performing step 72, system 20 transmits a large number of DNS queries from each of the simulated subscribers, within a relatively short period of time. Then, at response-checking step 74, the system checks whether responses to the DNS queries were received. If yes, the system reports a negative result; otherwise, the system reports a positive result. (In this case, the lack of responses to the DNS queries indicates that the relevant DoS detection probe successfully detected the DoS attack, and therefore prevented the DNS queries from reaching the relevant DNS server.)

In some embodiments, the system also simulates benign subscribers, from which a normal number of DNS queries are sent. In such embodiments, the system reports a positive result only if (i) responses were not received for the malicious DNS queries, but (ii) responses were received for the benign DNS queries. Likewise, benign subscribers may be simulated for any other relevant simulation described herein, in order to verify that prevention of a particular unauthorized use does not also compromise the ability of benign subscribers to engage in authorized use of the network. In other words, whenever relevant, in addition to simulating an unauthorized use of the network by a malicious subscriber, the system may simulate an authorized use by another subscriber, by generating, and then transmitting, traffic that appears to have originated from the other subscriber. The output of the system then indicates both the result of the simulated unauthorized use and the result of the simulated authorized use.

Control-Traffic Attacks

In general, the term "control-traffic attack," in the context of the present description and claims, refers to any type of attack in which spurious control traffic is transmitted with the aim of compromising the network's ability to respond to legitimate traffic. (A control-traffic attack is thus a type of DoS attack that is directed against the cellular network itself, rather than, for example, against a DNS server that is external to the network.) For example, one or more subscribers may transmit a large number of spurious handover notifications, or a large number of requests to attach to the network, during a short period of time.

To simulate a control-traffic attack, the system creates and/or loads one or more simulated subscribers at creating-and-or-loading step 70, and then transmits the spurious control traffic from the simulated subscribers at simulation-performing step 72. Then, at response-checking step 74, the system checks the volume and/or rate of responses from the CN to the spurious control traffic. If the volume and/or rate of responses are above threshold values, the system reports a negative result; otherwise, the system reports a positive result. (The system may also simulate benign control traffic, and report a positive result only if the CN, in addition to ignoring the malicious traffic, responds to the benign control traffic.)

Illicit Exchange of Data

To simulate an illicit exchange of data (e.g., on an LTE network), the system creates and/or loads a first simulated subscriber and a second simulated subscriber at creating-and-or-loading step 70. Subsequently, at simulation-performing step 72, the system attempts to unauthorizedly pass data within a control packet, such as within a Session Initiation Protocol (SIP) message, from the first simulated subscriber to the second simulated subscriber. In other words, the system unauthorizedly includes data with the transmitted control packet, i.e., the system includes, within the control packet, data that are not authorized by the network for inclusion within a control packet. Then, at response-checking step 74, the system checks whether the data were received by the second simulated subscriber. If yes, the system reports a negative result. Otherwise (i.e., if the data were stripped from the control packet, or if the control packet was not received at all), the system reports a positive result.

Subscriber-to-Subscriber Traffic

To simulate a transmission of subscriber-to-subscriber traffic, the system creates and/or loads a first simulated subscriber and a second simulated subscriber at creating-and-or-loading step 70. Subsequently, at simulation-performing step 72, the system attempts to transmit traffic from the first simulated subscriber directly to the second simulated subscriber, by including a destination identifier (such as an IP address) of the second simulated subscriber in the traffic. Then, at response-checking step 74, the system checks whether the traffic was received by the second simulated subscriber. If yes, the system reports a negative result. Otherwise, the system reports a positive result, indicating that the network successfully prevented the exchange of direct subscriber-to-subscriber traffic.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a digital memory; and
a processor, configured:
to generate, using information stored in the digital memory, traffic that appears to have originated from at least one cellular communication terminal,
to inject the generated traffic, from a network side of the cellular communication network, into a flow of traffic over the network, such as to simulate an unauthorized use of the network by the at least one cellular communication terminal,
to ascertain a result of the simulated unauthorized use, and
to generate an output indicative of the result.

2. The system according to claim 1, wherein the processor is configured to transmit the generated traffic to a core network (CN) of the cellular communication network by injecting the generated traffic into the flow of traffic.

3. The system according to claim 1, wherein the generated traffic is first generated traffic, and wherein the processor is further configured to:
generate second traffic that appears to have originated from at least one other cellular communication terminal, inject the second generated traffic into the flow of traffic, such as to simulate an authorized use of the network by the at least one other cellular communication terminal, and ascertain a result of the simulated authorized use, wherein the output is indicative of both the result of the simulated unauthorized use and the result of the simulated authorized use.

4. The system according to claim 1, wherein the at least one cellular communication terminal includes a plurality of cellular communication terminals, and wherein the processor is configured to inject the generated traffic from a single point in the cellular communication network.

5. The system according to claim 1, wherein the processor is configured, in generating the traffic, to format the traffic to appear as if the traffic was received from a plurality of base stations belonging to the cellular communication network.

6. The system according to claim 1, wherein the processor is configured to inject the traffic from between a radio access network (RAN) and a core network (CN) of the cellular communication network.

7. The system according to claim 1, wherein the generated traffic includes a control packet, and wherein the processor is configured to simulate the unauthorized use by unauthorizedly passing data within the control packet.

8. The system according to claim 7, wherein the control packet includes a Session Initiation Protocol (SIP) message.

9. The system according to claim 1, wherein the generated traffic includes a destination identifier of another cellular communication terminal.

10. The system according to claim 1, wherein the generated traffic includes a source identifier of another cellular communication terminal.

11. The system according to claim 1, wherein the processor is configured to simulate the unauthorized use by simulating a denial-of-service (DoS) attack.

12. The system according to claim 1, wherein the processor is configured to simulate the unauthorized use by simulating a control-traffic attack against the cellular communication network.

13. A method, comprising:
generating traffic that appears to have originated from at least one cellular communication terminal;
injecting the generated traffic, from a network side of the cellular communication network, into a flow of traffic over the network, such as to simulate an unauthorized use of the network by the at least one cellular communication terminal;
ascertaining a result of the simulated unauthorized use; and
generating an output indicative of the result.

14. The method according to claim 13, wherein injecting the traffic comprises transmitting the traffic to a core network (CN) of the cellular communication network.

15. The method according to claim 13, wherein the generated traffic is first generated traffic, and wherein the method further comprises:
generating second traffic that appears to have originated from at least one other cellular communication terminal;
injecting the second generated traffic into the flow of traffic, such as to simulate an authorized use of the network by the at least one other cellular communication terminal; and
ascertaining a result of the simulated authorized use,
wherein the output is indicative of both the result of the simulated unauthorized use and the result of the simulated authorized use.

16. The method according to claim 13, wherein the at least one cellular communication terminal includes a plurality of cellular communication terminals, and wherein injecting the generated traffic comprises injecting the generated traffic from a single point in the cellular communication network.

17. The method according to claim 13, wherein generating the traffic comprises formatting the traffic to appear as if the traffic was received from a plurality of base stations belonging to the cellular communication network.

18. The method according to claim 13, wherein injecting the generated traffic comprises injecting the generated traffic from between a radio access network (RAN) and a core network (CN) of the cellular communication network.

19. The method according to claim 13, wherein the generated traffic includes a control packet, and wherein simulating the unauthorized use comprises simulating the unauthorized use by unauthorizedly passing data within the control packet.

20. The method according to claim 19, wherein the control packet includes a Session Initiation Protocol (SIP) message.

21. The method according to claim 13, wherein the generated traffic includes a destination identifier of another cellular communication terminal.

22. The method according to claim 13, wherein the generated traffic includes a source identifier of another cellular communication terminal.

23. The method according to claim 13, wherein simulating the unauthorized use comprises simulating the unauthorized use by simulating a denial-of-service (DoS) attack.

24. The method according to claim 13, wherein simulating the unauthorized use comprises simulating the unauthorized use by simulating a control-traffic attack against the cellular communication network.

25. A computer software product comprising a tangible non-transitory computer-readable medium in which program instructions are stored, which instructions, when read by a processor, cause the processor:
to generate traffic that appears to have originated from at least one cellular communication terminal,
to inject the generated traffic, from a network side of the cellular communication network, into a flow of traffic over the network, such as to simulate an unauthorized use of the network by the at least one cellular communication terminal,
to ascertain a result of the simulated unauthorized use, and
to generate an output indicative of the result.

26. The computer software product according to claim 25, wherein the instructions further cause the processor to format the traffic to appear as if the traffic was received from a plurality of base stations belonging to the cellular communication network.

* * * * *